United States Patent
Johnson et al.

(10) Patent No.: US 11,931,973 B2
(45) Date of Patent: Mar. 19, 2024

(54) WEATHERABLE FIBER-REINFORCED PROPYLENE COMPOSITION

(71) Applicant: Ticona LLC, Florence, KY (US)

(72) Inventors: Aaron H. Johnson, Winona, MN (US); Darin Grinsteinner, Fort Mitchell, KY (US)

(73) Assignee: Ticona LLC, Florence, KY (US)

( * ) Notice: Subject to any disclaimer, the term of this patent is extended or adjusted under 35 U.S.C. 154(b) by 537 days.

(21) Appl. No.: 16/279,035

(22) Filed: Feb. 19, 2019

(65) Prior Publication Data

US 2019/0270260 A1 Sep. 5, 2019

Related U.S. Application Data

(60) Provisional application No. 62/637,675, filed on Mar. 2, 2018.

(51) Int. Cl.

| | |
|---|---|
| B29C 70/20 | (2006.01) |
| B29C 70/44 | (2006.01) |
| B29K 23/00 | (2006.01) |
| B29K 309/08 | (2006.01) |
| C08K 5/00 | (2006.01) |
| C08K 5/105 | (2006.01) |
| C08K 5/3492 | (2006.01) |
| C08K 5/38 | (2006.01) |
| C08K 5/527 | (2006.01) |
| C08K 7/14 | (2006.01) |
| C08L 23/12 | (2006.01) |
| C08L 23/14 | (2006.01) |

(52) U.S. Cl.
CPC ............ *B29C 70/20* (2013.01); *B29C 70/443* (2013.01); *C08K 5/005* (2013.01); *C08K 5/105* (2013.01); *C08K 5/34924* (2013.01); *C08K 5/38* (2013.01); *C08K 5/527* (2013.01); *C08K 7/14* (2013.01); *C08L 23/12* (2013.01); *C08L 23/14* (2013.01); *B29K 2023/12* (2013.01); *B29K 2023/14* (2013.01); *B29K 2309/08* (2013.01)

(58) Field of Classification Search
None
See application file for complete search history.

(56) References Cited

U.S. PATENT DOCUMENTS

| | | | |
|---|---|---|---|
| 3,322,718 A | 5/1967 | Jacob | |
| 3,409,587 A | 11/1968 | Mills | |
| 3,558,554 A | 1/1971 | Kuriyama et al. | |
| 3,629,194 A | 12/1971 | Onishi et al. | |
| 4,206,111 A | 6/1980 | Valdiserri et al. | |
| 4,261,880 A | 4/1981 | Fujii et al. | |
| 4,403,053 A | 9/1983 | Lewis | |
| RE32,772 E | 10/1988 | Hawley | |
| 5,081,170 A | 1/1992 | Yagi et al. | |
| 5,155,153 A | 10/1992 | Neri et al. | |
| 5,166,239 A | 11/1992 | Memon et al. | |
| 6,518,344 B1 | 2/2003 | Chundury et al. | |
| 6,538,056 B1 | 3/2003 | Webster | |
| 6,664,317 B2 | 12/2003 | King, III | |
| 6,774,170 B2 | 8/2004 | Webster | |
| 6,780,506 B2 | 8/2004 | Oobayashi et al. | |
| 7,375,149 B2 | 5/2008 | Rotzinger | |
| 9,233,486 B2 | 1/2016 | Regan et al. | |
| 9,278,472 B2 | 3/2016 | Eastep et al. | |
| 9,428,637 B2* | 8/2016 | Kohler | C08L 51/06 |
| 10,266,673 B2 | 4/2019 | Shimizu et al. | |
| 2012/0199278 A1* | 8/2012 | Lee | C08L 23/12 |
| | | | 156/244.11 |
| 2014/0073731 A1* | 3/2014 | Inamdar | C08L 23/10 |
| | | | 524/528 |
| 2016/0185320 A1 | 6/2016 | An | |

FOREIGN PATENT DOCUMENTS

| | | |
|---|---|---|
| CN | 103788470 A | 5/2014 |
| CN | 104419015 A | 3/2015 |
| JP | H 10138242 A | 5/1998 |
| WO | WO 02/46503 A1 | 6/2002 |
| WO | WO 2019/002315 A1 | 1/2019 |
| WO | WO 2019/064203 A1 | 4/2019 |

OTHER PUBLICATIONS

Ghasemzadeh-Barvarz et al., "Mechanical, water absorption, and aging properties of polypropylene/flax/Glass fiber hybrid composites," *Journal of Composite Materials*, vol. 49, No. 30, Jan. 22, 2015, pp. 3781-3798 (1-18).

Yadav et al., "Functional finishing in cotton fabrics using zinc oxide nanoparticles," *Bull. Mater. Sci.*, vol. 29, No. 6. Nov. 2006, pp. 641-645.

International Search Report and Written Opinion for PCT/US2019/018936 dated Apr. 15, 2019, 10 pages.

Supplementary European Search Report for EP 19 76 0144 dated Oct. 1, 2021, 9 pages.

* cited by examiner

*Primary Examiner* — Robert T Butcher

(74) *Attorney, Agent, or Firm* — Dority & Manning P.A.

(57) ABSTRACT

A fiber-reinforced polymer composition that comprises a polymer matrix that contains a propylene polymer is provided. The polymer matrix constitutes from about 20 wt. % to about 90 wt. % of the composition, and the composition further comprises a plurality of long reinforcing fibers that are distributed within the polymer matrix, wherein the fibers constitute from about 10 wt. % to about 60 wt. % of the composition. Further, the composition also comprises a stabilizer system comprising a sterically hindered phenol antioxidant, phosphite antioxidant, and thioester antioxidant.

24 Claims, 2 Drawing Sheets

US 11,931,973 B2

WEATHERABLE FIBER-REINFORCED PROPYLENE COMPOSITION

RELATED APPLICATION

The present application claims priority to U.S. Application Ser. No. 62/637,675 (filed on Mar. 2, 2018), which is incorporated herein in its entirety by reference thereto.

BACKGROUND OF THE INVENTION

Automotive components generally contain a wide variety of polymeric materials. Polypropylene materials, for example, are often employed in automotive interior components. However, one of the common issues that manufacturers face when attempting to use such materials in an automotive component is that they tend to exhibit poor performance when exposed to high temperatures or ultraviolet light. To help develop a more "weatherable" material, various attempts have been made to incorporate stabilizing systems into the composition. Unfortunately, none of the systems have shown satisfactory performance to date. As such, a need currently exists for a polymer composition that is weatherable in that is better able to remain stable after being exposed to high temperatures and/or ultraviolet light.

SUMMARY OF THE INVENTION

In accordance with one embodiment of the present invention, a fiber-reinforced polymer composition is disclosed that comprises a polymer matrix that contains a propylene polymer. The polymer matrix constitutes from about 20 wt. % to about 90 wt. % of the composition, and the composition further comprises a plurality of long reinforcing fibers that are distributed within the polymer matrix, wherein the fibers constitute from about 10 wt. % to about 60 wt. % of the composition. Further, the composition also comprises a stabilizer system comprising a sterically hindered phenol antioxidant, phosphite antioxidant, and thioester antioxidant.

In accordance with another embodiment of the present invention, a stabilizer system for use in a fiber-reinforced polymer composition is disclosed. The stabilizer system comprises a sterically hindered phenol antioxidant, phosphite antioxidant, and thioester antioxidant, wherein the weight ratio of the phosphite antioxidant to the sterically hindered phenol antioxidant within the system is from about 1:1 to about 5:1, the weight ratio of the thioester antioxidant to the sterically hindered phenol antioxidant in the system is from about 2:1 to about 10:1, and the weight ratio of the thioester antioxidant to the hindered phenol antioxidant is from about 2:1 to about 10:1.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
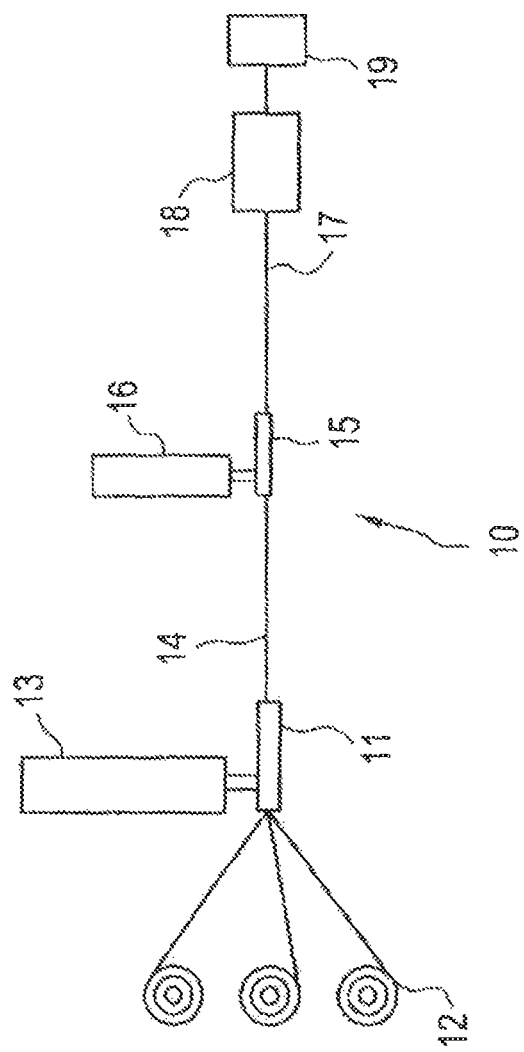
FIG. 1 is a schematic illustration of one embodiment of a system that may be used to form the fiber-reinforced polymer composition of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a weatherable fiber-reinforced composition for use in a shaped part (e.g., injection molded part) that is capable of exhibiting good performance even after exposure to various conditions (e.g., high temperatures). More particularly, the composition contains a plurality of long reinforcing fibers that are distributed within a polymer matrix that contains a propylene polymer. Long fibers may, for example, constitute from about 10 wt. % to about 60 wt. %, in some embodiments from about 15 wt. % to about 55 wt. %, and in some embodiments, from about 20 wt. % to about 50 wt. % of the composition. Likewise, the polymer matrix typically constitutes from about 20 wt. % to about 90 wt. %, in some embodiments from about 35 wt. % to about 85 wt. %, and in some embodiments, from about 50 wt. % to about 80 wt. % of the composition.

The composition also contains a stabilizer system that includes a synergistic blend of various antioxidants, including a hindered phenol antioxidant, phosphite antioxidant, and thioester antioxidant. Through selective control over the particular nature and concentration of each of these components, the present inventors have discovered that the resulting composition can excellent stability in mechanical properties even after being exposed to high temperatures. For example, the composition may initially exhibit a Charpy unnotched impact strength greater than about 15 kJ/m$^2$, in some embodiments from about 20 to about 80 kJ/m$^2$, and in some embodiments, from about 30 to about 60 kJ/m$^2$, measured at 23° C. according to ISO Test No. 179-1:2010) (technically equivalent to ASTM D256-10e1). The initial tensile and flexural mechanical properties may also be good. For example, the composition may exhibit a tensile strength of from about 20 to about 300 MPa, in some embodiments from about 30 to about 200 MPa, and in some embodiments, from about 40 to about 150 MPa; a tensile break strain of about 0.5% or more, in some embodiments from about 0.6% to about 5%, and in some embodiments, from about 0.7% to about 2.5%; and/or a tensile modulus of from about 3,500 MPa to about 20,000 MPa, in some embodiments from about 4,000 MPa to about 15,000 MPa, and in some embodiments, from about 5,000 MPa to about 10,000 MPa. The tensile properties may be determined in accordance with ISO Test No. 527-1:2012 (technically equivalent to ASTM D638-14) at 23° C. or 80° C. The composition may also exhibit an initial flexural strength of from about 50 to about 500 MPa, in some embodiments from about 80 to about 400 MPa, and in some embodiments, from about 100 to about 250 MPa and/or a flexural modulus of from about 2000 MPa to about 20,000 MPa, in some embodiments from about 3,000 MPa to about 15,000 MPa, and in some embodiments, from about 4,000 MPa to about 10,000 MPa. The flexural properties may be determined in accordance with ISO Test No. 178:2010 (technically equivalent to ASTM D790-15e2) at 23° C. or 80° C.

Notably, however, the present inventors have also discovered that the fiber-reinforced composition is not highly sensitive to aging at high temperatures. For example, a part formed from the fiber-reinforced composition may be aged in an atmosphere having a temperature of from about 100° C. or more, in some embodiments from about 120° C. to about 200° C., and in some embodiments, from about 130° C. to about 180° C. (e.g., 150° C.) for a time period of about 100 hours or more, in some embodiments from about 300 hours to about 3000 hours, and in some embodiments, from about 400 hours to about 2500 hours (e.g., about 1,000 hours). Even after aging, the mechanical properties (e.g., impact strength, tensile properties, and/or flexural properties) may remain within the ranges noted above. For example, the ratio of a particular mechanical property (e.g., Charpy unnotched impact strength, flexural strength, etc.) after "aging" at 150° C. for 1,000 hours to the initial mechanical property prior to such aging may be about 0.6 or more, in some embodiments about 0.7 or more, and in some embodiments, from about 0.8 to 1.0. In one embodiment, for example, a part may exhibit a Charpy unnotched impact strength after being aged at a high temperature (e.g., 150° C.) for 1,000 hours of greater than about 15 kJ/m$^2$, in some embodiments from about 20 to about 80 kJ/m$^2$, and in some embodiments, from about 30 to about 60 kJ/m$^2$, measured according to ISO Test No. 179-1:2010 at a temperature of 23° C.) (technically equivalent to ASTM D256-10e1). The part may also, for example, exhibit a flexural strength after being aged at a high temperature atmosphere (e.g., 150° C.) for 1,000 hours of about 50 to about 500 MPa, in some embodiments from about 80 to about 400 MPa, and in some embodiments, from about 100 to about 250 MPa, measured according to ISO Test No. 178:2010 at a temperature of 23° C. (technically equivalent to ASTM D790-15e2). Likewise, the part may exhibit a tensile strength after being aged at a high temperature atmosphere (e.g., 150° C.) for 1,000 hours of from about 20 to about 300 MPa, in some embodiments from about 30 to about 200 MPa, and in some embodiments, from about 40 to about 150 MPa as determined at a temperature of 23° C. in accordance with ISO Test No. 527-1:2012 (technically equivalent to ASTM D638-14).

Similarly, the present inventors have discovered that the fiber-reinforced composition is not highly sensitive to ultraviolet light. For example, a part formed from the fiber-reinforced composition may be exposed to one or more cycles of ultraviolet light. In one embodiment, for instance, the specimen can be subjected to ten cycles (2800 kJ/m$^2$ or 280 kJ/m$^2$ per cycle). Even after such exposure, the mechanical properties (e.g., impact strength, tensile properties, and/or flexural properties) and the ratio of such properties may remain within the ranges noted above.

Various embodiments of the present invention will now be described in more detail.

I. Polymer Matrix

A. Propylene Polymer

The polymer matrix functions as a continuous phase of the composition and contains one or more propylene polymers. Any of a variety of propylene polymers or combinations of propylene polymers may generally be employed, such as propylene homopolymers (e.g., syndiotactic, atactic, isotactic, etc.), propylene copolymers (e.g., block copolymer, random copolymer, heterophase copolymers, etc.), and so forth. In one embodiment, for instance, a propylene polymer may be employed that is an isotactic or syndiotactic homopolymer. The term "syndiotactic" generally refers to a tacticity in which a substantial portion, if not all, of the methyl groups alternate on opposite sides along the polymer chain. On the other hand, the term "isotactic" generally refers to a tacticity in which a substantial portion, if not all, of the methyl groups are on the same side along the polymer chain. Such homopolymers may have a melting point of from about 160° C. to about 170° C. In yet other embodiments, a copolymer of propylene with an α-olefin monomer may be employed. Specific examples of suitable α-olefin monomers may include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. The overall propylene content of such copolymers may be from about 60 wt. % to about 99 wt. %, in some embodiments from about 70 wt. % to about 97 wt. %, and in some embodiments, from about 80 wt. % to about 95 wt. %. Likewise, the overall α-olefin content may likewise range from about 1 wt. % to about 40 wt. %, in some embodiments from about 3 wt. % to about 30 wt. %, and in some embodiments, from about 5 wt. % to about 20 wt. %.

In certain embodiments, the propylene polymer may be a heterophase copolymer that is formed from at least two components—i.e., a matrix phase and dispersed phase. The matrix phase typically includes an isotactic propylene homopolymer, though an α-olefin comonomer may be used in relatively small amounts, such as about 10 wt. % or less, in some embodiments about 6 wt. % or less, and in some embodiments, about 4 wt. % or less. While by no means required, the inclusion of a small amount of comonomer may result in a product with lower stiffness but with higher impact strength. Regardless of the particular polymer employed, the matrix phase typically has a low xylene solubles content, such as about 3 wt. % or less, in some embodiments about 2 wt. % or less, and in some embodiments, about 1.5 wt. % or less. The dispersed phase typically includes a propylene/α-olefin copolymer such as described above (e.g., propylene/ethylene copolymer). In the dispersed phase, the α-olefin content is generally present at a higher level than the overall content of the copolymer as noted above. For instance, the α-olefin content of the dispersed phase may be from about 40 wt. % to about 90 wt. %, in some embodiments from about 45 wt. % to about 85 wt. %, and in some embodiments, from about 50 wt. % to about 80 wt. %. Likewise, the propylene content of the dispersed phase may range from about 10 wt. % to about 60 wt. %, in some embodiments from about 15 wt. % to about 55 wt. %, and in some embodiments, from about 20 wt. % to about 50 wt. %. While such heterophase copolymers can be produced by melt compounding the individual polymer components, it is typically desired that they are made in a reactor. This is conveniently accomplished by polymerizing propylene in a first reactor and transferring the high crystalline propylene homopolymer from the first reactor into a secondary reactor where propylene and the α-olefin monomer (e.g., ethylene) are copolymerized in the presence of the homopolymer. Any of a variety of known catalyst systems may generally be employed to form the propylene polymers. For instance, the polymers may be formed using a free radical or a coordination catalyst (e.g., Ziegler-Natta) or a single-site coordination catalyst (e.g., metallocene catalyst).

The propylene polymer typically has a melt flow index of from about 20 to about 300 grams per 10 minutes or more, in some embodiments from about 50 to about 250 grams per 10 minutes or less, and in some embodiments, from about 80 to about 160 grams per 10 minutes, as determined in accordance with ISO 1133-1:2011 (technically equivalent to ASTM D1238-13) at a load of 2.16 kg and temperature of 230° C. Further, the propylene polymer may also exhibit a high degree of impact resistance. In this regard, the polymer may exhibit an Izod notched impact strength of greater than about 20 kJ/m², in some embodiments from about 30 to about 100 kJ/m², and in some embodiments, from about 40 to about 80 kJ/m², measured at 23° C. according to ISO Test No. 180:2000 (technically equivalent to ASTM D256-10e1). Notably, the polymer may retain a substantial portion of this strength even at extreme temperatures. For example, the ratio of the Izod notched impact strength at −20° C. to the impact strength at 23° C. may be about 0.6 or more, in some embodiments about 0.6 or more, and in some embodiments, from about 0.7 to 1.0. In one embodiment, for example, the propylene polymer may exhibit an Izod notched impact strength at −20° C. of greater than about 15 kJ/m², in some embodiments from about 20 to about 80 kJ/m², and in some embodiments, from about 30 to about 50 kJ/m², measured at 23° C. according to ISO Test No. 180:2000 (technically equivalent to ASTM D256-10e1).

B. Stabilizer System

As noted above, the stabilizer system of the present invention employs a synergistic combination of various antioxidants, including a sterically hindered phenol antioxidant, phosphite antioxidant, and thioester antioxidant. Namely, the weight ratio of the phosphite antioxidant to the hindered phenol antioxidant is generally from about 1:1 to about 5:1, in some embodiments from about 1:1 to about 4:1, and in some embodiments, from about 1.5:1 to about 3:1 (e.g., about 2:1). The weight ratio of the thioester stabilizer to the phosphite antioxidant is also generally from about 1:1 to about 5:1, in some embodiments from about 1:1 to about 4:1, and in some embodiments, from about 1.5:1 to about 3:1 (e.g., about 2:1). Likewise, the weight ratio of the thioester antioxidant to the hindered phenol antioxidant is also generally from about 2:1 to about 10:1, in some embodiments from about 2:1 to about 8:1, and in some embodiments, from about 3:1 to about 6:1 (e.g., about 4:1). Within these selected ratios, it is believed that the composition is capable of achieving a unique ability to remain stable even after exposure to high temperatures and/or ultraviolet light.

i. Sterically Hindered Phenol

The sterically hindered phenol is typically present within the composition in an amount of from about 0.01 to about 1 wt. %, in some embodiments from about 0.02 wt. % to about 0.5 wt. %, and in some embodiments, from about 0.05 wt. % to about 0.3 wt. % of the polymer composition. While a variety of different compounds may be employed, particularly suitable hindered phenol compounds are those having one of the following general structures (IV), (V) and (VI):

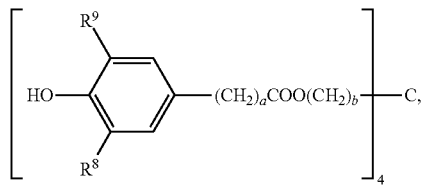

(IV)

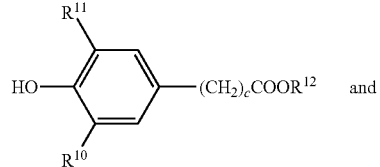

(V)

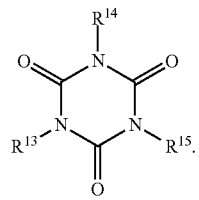

(VI)

wherein,
a, b and c independently range from 1 to 10, and in some embodiments, from 2 to 6;
$R^8$, $R^9$, $R^{10}$, $R^{11}$, and $R^{12}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties; and
$R^{13}$, $R^{14}$ and $R^{15}$ are independently selected from moieties represented by one of the following general structures (VII) and (VIII):

(VII)

(VIII)

wherein,
d ranges from 1 to 10, and in some embodiments, from 2 to 6;
$R^{16}$, $R^{17}$, $R^{18}$, and $R^{19}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Specific examples of suitable hindered phenols having a general structure as set forth above may include, for instance, 2,6-di-tert-butyl-4-methylphenol; 2,4-di-tert-butyl-phenol; pentaerythrityl tetrakis(3,5-di-tert-butyl-4-hydroxyphenyl)propionate; octadecyl-3-(3',5'-di-tert-butyl-4'-hydroxyphenyl)propionate; tetrakis[methylene(3,5-di-tert-butyl-4-hydroxycinnamate)]methane; bis-2,2'-methylene-bis(6-tert-butyl-4-methylphenol)terephthalate; 1,3,5-trimethyl-2,4,6-tris(3,5-di-tert-butyl-4-hydroxybenzyl) benzene; tris(3,5-di-tert-butyl-4-hydroxybenzyl) isocyanurate; 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane; 1,3,5-triazine-2,4,6(1H,3H,5H)-trione; 1,3,5-tris[[3,5-bis-(1,1-dimethylethyl)-4-hydroxyphenyl]methyl]; 4,4',4''-[(2,4,6-trimethyl-1,3,5-benzenetriyl)tris-(methylene)]tris[2,6-bis(1,1-dimethylethyl)]; 6-tert-butyl-3-methylphenyl; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxydiphenyl-cyclohexane; alkylated bisphenol; styrenated phenol; 2,6- di-tert-butyl-4-methylphenol; n-octadecyl-3-(3',5'-di-tert-butyl-4'-hydroxyphenyl)propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl) propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; tetrakis[methylene-3-(3', 5'-di-tert-butyl-4'-hydroxyphenyl)propionate]methane, stearyl 3,5-di-tert-butyl-4-hydroxyhydrocinnamate; and so forth, as well as mixtures thereof.

Particularly suitable compounds are those having the general structure (VI), such as tris(3,5-di-tert-butyl-4-hydroxybenzyl)isocyanurate, which is commercially available under the designation Irganox® 3114.

ii. Phosphite

The phosphite antioxidant is typically present within the composition in an amount of from about 0.02 to about 2 wt. %, in some embodiments from about 0.04 wt. % to about 1 wt. %, and in some embodiments, from about 0.1 wt. % to about 0.6 wt. % of the polymer composition. The phosphite antioxidant may include a variety of different compounds, such as aryl monophosphites, aryl disphosphites, etc., as well as mixtures thereof. For example, an aryl diphosphite may be employed that has the following general structure (IX):

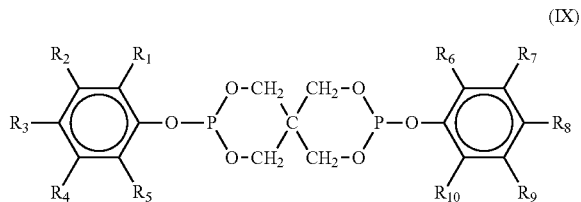

wherein, $R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Examples of such aryl diphosphite compounds include, for instance, bis(2,4-dicumylphenyl)pentaerythritol diphosphite (commercially available as Doverphos® S-9228) and bis(2,4-di-t-butylphenyl)pentaerythritol diphosphite (commercially available as Ultranox® 626). Likewise, suitable aryl monophosphites may include tris(2,4-di-tert-butylphenyl)phosphite (commercially available as Irgafos® 168); bis(2,4-di-tert-butyl-6-methylphenyl) ethyl phosphite (commercially available as Irgafos® 38); and so forth.

iii. Thioester

The thioester antioxidant is typically present within the composition in an amount of from about 0.04 to about 4 wt. %, in some embodiments from about 0.08 wt. % to about 2 wt. %, and in some embodiments, from about 0.2 wt. % to about 1.2 wt. % of the polymer composition. Particularly suitable thioester antioxidants for use in the present invention are thiocarboxylic acid esters, such as those having the following general structure:

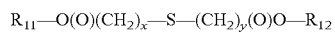

wherein, x and y are independently from 1 to 10, in some embodiments 1 to 6, and in some embodiments, 2 to 4 (e.g., 2); $R_{11}$ and $R_{12}$ are independently selected from linear or branched, $C_6$ to $C_{30}$ alkyl, in some embodiments $C_{10}$ to $C_{24}$ alkyl, and in some embodiments, $C_{12}$ to $C_{20}$ alkyl, such as lauryl, stearyl, octyl, hexyl, decyl, dodecyl, oleyl, etc.

Specific examples of suitable thiocarboxylic acid esters may include for instance, distearyl thiodipropionate (commercially available as Irganox® PS 800), dilauryl thiodipropionate (commercially available as Irganox® PS 802), di-2-ethylhexyl-thiodipropionate, diisodecyl thiodipropionate, etc.

C. Other Components

In addition to the propylene polymer and antistatic agent, the polymer matrix may also contain a variety of other components. Examples of such optional components may include, for instance, compatibilizers, stabilizers (e.g., ultraviolet light stabilizer, light stabilizers, heat stabilizers, etc.), particulate fillers, lubricants, colorants, flow modifiers, and other materials added to enhance properties and processability. In certain embodiments, for example, the composition may contain a UV stabilizer. Suitable UV stabilizers may include, for instance, benzophenones (e.g., (2-hydroxy-4-(octyloxy)phenyl)phenyl, methanone (Chimassorb® 81), benzotriazoles (e.g., 2-(2-hydroxy-3,5-di-α-cumylphenyl)-2H-benzotriazole (Tinuvin® 234), 2-(2-hydroxy-5-tert-octylphenyl)-2H-benzotriazole (Tinuvin® 329), 2-(2-hydroxy-3-α-cumyl-5-tert-octylphenyl)-2H-benzotriazole (Tinuvin® 928), etc.), triazines (e.g., 2,4-diphenyl-6-(2-hydroxy-4-hexyloxyphenyl)-s-triazine (Tinuvin® 1577)), sterically hindered amines (e.g., bis(2,2,6,6-tetramethyl-4-piperidyl) sebacate (Tinuvin® 770) or a polymer of dimethyl succinate and 1-(2-hydroxyethyl)-4-hydroxy-2,2,6,6-tetramethyl-4-piperidine (Tinuvin®622)), and so forth, as well as mixtures thereof. When employed, such UV stabilizers typically constitute from about 0.05 wt. % to about 2 wt. % in some embodiments from about 0.1 wt. % to about 1.5 wt. %, and in some embodiments, from about 0.2 wt. % to about 1.0 wt. % of the composition.

The polymer composition may also contain a pigment, such as titanium dioxide, ultramarine blue, cobalt blue, phthalocyanines, anthraquinones, carbon black, metallic pigment etc., as well as mixtures thereof. Such pigments typically constitute from about 0.01 to about 3 wt. %, and in some embodiments, from about 0.5 wt. % to about 2 wt. % of the composition. If desired, a compatibilizer may also be employed to enhance the degree of adhesion between the long fibers with the propylene polymer. When employed, such compatibilizers typically constitute from about 0.1 wt. % to about 15 wt. %, in some embodiments from about 0.5 wt. % to about 10 wt. %, and in some embodiments, from about 1 wt. % to about 5 wt. % of the polymer composition. In certain embodiments, the compatibilizer may be a polyolefin compatibilizer that contains a polyolefin that is modified with a polar functional group. The polyolefin may be an olefin homopolymer (e.g., polypropylene) or copolymer (e.g., ethylene copolymer, propylene copolymer, etc.). The functional group may be grafted onto the polyolefin backbone or incorporated as a monomeric constituent of the polymer (e.g., block or random copolymers), etc. Particularly suitable functional groups include maleic anhydride, maleic acid, fumaric acid, maleimide, maleic acid hydrazide, a reaction product of maleic anhydride and diamine, dichloromaleic anhydride, maleic acid amide, etc.

Regardless of the particular components employed, the raw materials (e.g., propylene polymer, stabilizing system, compatibilizers, etc.) are typically melt blended together prior to being reinforced with the long fibers. The raw materials may be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing. For example, the propylene polymer may be fed to a feeding port of the twin-screw extruder and melted. Thereafter, the antioxidants and/or stabilizers may be injected into the polymer melt. Alternatively, the antioxidants and/or stabilizers may be separately fed into the extruder at a different point along its length. Regardless of the particular melt blending technique chosen, the raw materials are blended under high shear/pressure and heat to ensure sufficient mixing. For example, melt blending may occur at a temperature of from about 150° C. to about 300° C., in some embodiments, from about 155° C. to about 250° C., and in some embodiments, from about 160° C. to about 220° C.

As noted above, certain embodiments of the present invention contemplate the use of a blend of polymers within the polymer matrix (e.g., propylene homopolymers and/or propylene/α-olefin copolymers). In such embodiments, each of the polymers employed in the blend may be melt blended in the manner described above. In yet other embodiments, however, it may be desired to melt blend a first propylene polymer (e.g., homopolymer or copolymer) to form a concentrate, which is then reinforced with long fibers in the manner described below to form a precursor composition. The precursor composition may thereafter be blended (e.g., dry blended) with a second propylene polymer to form a fiber-reinforced composition with the desired properties. It should also be understood that additional polymers can also be added during prior to and/or during reinforcement of the polymer matrix with the long fibers.

II. Long Fibers

To form the fiber-reinforced composition of the present invention, long fibers are generally embedded within the polymer matrix. The term "long fibers" generally refers to fibers, filaments, yarns, or rovings (e.g., bundles of fibers) that are not continuous and have a length of from about 1 to about 25 millimeters, in some embodiments, from about 1.5 to about 20 millimeters, in some embodiments from about 2 to about 15 millimeters, and in some embodiments, from about 3 to about 12 millimeters. As noted above, due to the unique properties of the composition, a substantial portion of the fibers may maintain a relatively large length even after being formed into a shaped part (e.g., injection molding). That is, the median length (D50) of the fibers in the composition may be about 1 millimeter or more, in some embodiments about 1.5 millimeters or more, in some embodiments about 2.0 millimeters or more, and in some embodiments, from about 2.5 to about 8 millimeters.

The fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar®), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Any of a variety of different techniques may generally be employed to incorporate the fibers into the polymer matrix. The long fibers may be randomly distributed within the polymer matrix, or alternatively distributed in an aligned fashion. In one embodiment, for instance, continuous fibers may initially be impregnated into the polymer matrix to form an extrudate, which is thereafter cooled and then chopped into pellets to that the resulting fibers have the desired length for the long fibers. In such embodiments, the polymer matrix and continuous fibers (e.g., rovings) are typically pultruded through an impregnation die to achieve the desired contact between the fibers and the polymer. Pultrusion can also help ensure that the fibers are spaced apart and oriented in a longitudinal direction that is parallel to a major axis of the pellet (e.g., length), which further enhances the mechanical properties. Referring to FIG. 1, for instance, one embodiment of a pultrusion process 10 is shown in which a polymer matrix is supplied from an extruder 13 to an impregnation die 11 while continuous fibers 12 are a pulled through the die 11 via a puller device 18 to produce a composite structure 14. Typical puller devices may include, for example, caterpillar pullers and reciprocating pullers. While optional, the composite structure 14 may also be pulled through a coating die 15 that is attached to an extruder 16 through which a coating resin is applied to form a coated structure 17. As shown in FIG. 1, the coated structure 17 is then pulled through the puller assembly 18 and supplied to a pelletizer 19 that cuts the structure 17 into the desired size for forming the long fiber-reinforced composition.

Figure 2:
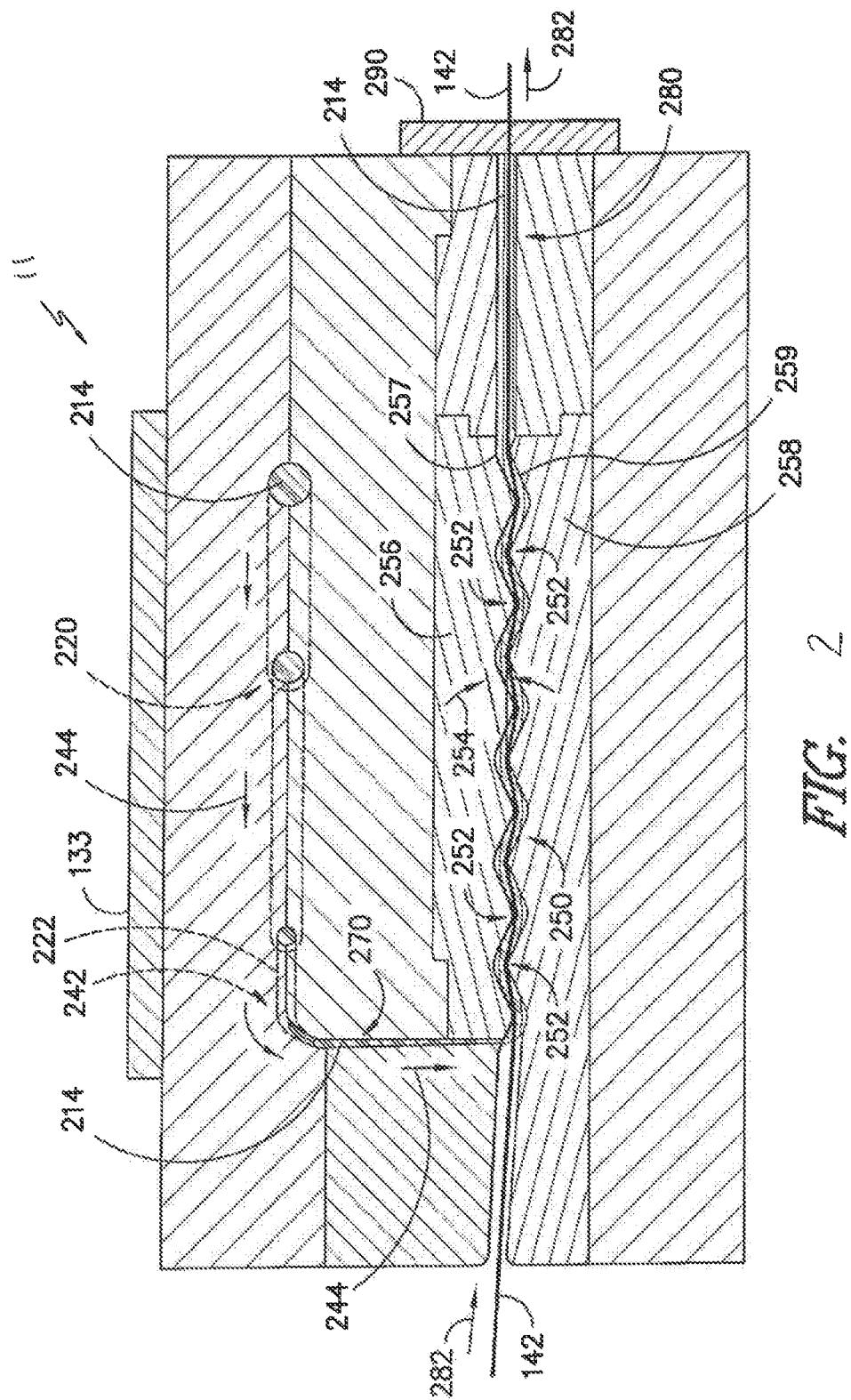
FIG. 2 is a cross-sectional view of an impregnation die that may be employed in the system shown in FIG. 1.

The nature of the impregnation die employed during the pultrusion process may be selectively varied to help achieved good contact between the polymer matrix and the long fibers. Examples of suitable impregnation die systems are described in detail in Reissue Pat. No. 32,772 to Hawley; U.S. Pat. No. 9,233,486 to Regan, et al.; and U.S. Pat. No. 9,278,472 to Eastep, et al. Referring to FIG. 2, for instance, one embodiment of such a suitable impregnation die 11 is shown. As shown, a polymer matrix 127 may be supplied to the impregnation die 11 via an extruder (not shown). More particularly, the polymer matrix 127 may exit the extruder through a barrel flange 128 and enter a die flange 132 of the die 11. The die 11 contains an upper die half 134 that mates with a lower die half 136. Continuous fibers 142 (e.g., roving) are supplied from a reel 144 through feed port 138 to the upper die half 134 of the die 11. Similarly, continuous fibers 146 are also supplied from a reel 148 through a feed port 140. The matrix 127 is heated inside die halves 134 and 136 by heaters 133 mounted in the upper die half 134 and/or lower die half 136. The die is generally operated at temperatures that are sufficient to cause melting and impregnation of the thermoplastic polymer. Typically, the operation temperatures of the die is higher than the melt temperature of the polymer matrix. When processed in this manner, the continuous fibers 142 and 146 become embedded in the matrix 127. The mixture is then pulled through the impregnation die 11 to create a fiber-reinforced composition 152. If desired, a pressure sensor 137 may also sense the pressure near the impregnation die 11 to allow control to be exerted over the rate of extrusion by controlling the rotational speed of the screw shaft, or the federate of the feeder.

Within the impregnation die, it is generally desired that the fibers contact a series of impingement zones. At these zones, the polymer melt may flow transversely through the fibers to create shear and pressure, which significantly enhances the degree of impregnation. This is particularly useful when forming a composite from ribbons of a high fiber content. Typically, the die will contain at least 2, in some embodiments at least 3, and in some embodiments, from 4 to 50 impingement zones per roving to create a sufficient degree of shear and pressure. Although their particular form may vary, the impingement zones typically possess a curved surface, such as a curved lobe, rod, etc. The impingement zones are also typically made of a metal material.

FIG. 2 shows an enlarged schematic view of a portion of the impregnation die 11 containing multiple impingement zones in the form of lobes 182. It should be understood that this invention can be practiced using a plurality of feed ports, which may optionally be coaxial with the machine direction. The number of feed ports used may vary with the number of fibers to be treated in the die at one time and the feed ports may be mounted in the upper die half 134 or the lower die half 136. The feed port 138 includes a sleeve 170 mounted in upper die half 134. The feed port 138 is slidably mounted in a sleeve 170. The feed port 138 is split into at least two pieces, shown as pieces 172 and 174. The feed port 138 has a bore 176 passing longitudinally therethrough. The bore 176 may be shaped as a right cylindrical cone opening away from the upper die half 134. The fibers 142 pass through the bore 176 and enter a passage 180 between the upper die half 134 and lower die half 136. A series of lobes 182 are also formed in the upper die half 134 and lower die half 136 such that the passage 210 takes a convoluted route. The lobes 182 cause the fibers 142 and 146 to pass over at least one lobe so that the polymer matrix inside the passage 180 thoroughly contacts each of the fibers. In this manner, thorough contact between the molten polymer and the fibers 142 and 146 is assured.

To further facilitate impregnation, the fibers may also be kept under tension while present within the impregnation die. The tension may, for example, range from about 5 to about 300 Newtons, in some embodiments from about 50 to about 250 Newtons, and in some embodiments, from about 100 to about 200 Newtons per tow of fibers. Furthermore, the fibers may also pass impingement zones in a tortuous path to enhance shear. For example, in the embodiment shown in FIG. 2, the fibers traverse over the impingement zones in a sinusoidal-type pathway. The angle at which the rovings traverse from one impingement zone to another is generally high enough to enhance shear, but not so high to cause excessive forces that will break the fibers. Thus, for example, the angle may range from about 1° to about 30°, and in some embodiments, from about 5° to about 25°.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

III. Shaped Parts

The fiber-reinforced composition may generally be employed to form a shaped part using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the fiber-reinforced composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the fiber-reinforced composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Regardless of the shaping technique employed, a wide variety of parts may be formed from the fiber-reinforced composition of the present invention. For example, the present inventors have discovered that relatively thin shaped parts (e.g., injection molded parts) can be readily formed from the resulting composition. For example, the parts may have a thickness of about 4 millimeters or less, in some embodiments about 2.5 millimeters or less, in some embodiments about 2 millimeters or less, in some embodiments about 1.8 millimeters or less, and in some embodiments, from about 0.1 to about 1.6 millimeters (e.g., 1.2 millimeters). Due to the thin nature of the parts that can be formed, the fiber-reinforced composition is particularly well suited for use in interior and exterior automotive parts (e.g., injection molded parts). Suitable exterior automotive parts may include fan shrouds, sunroof systems, door panels, front end modules, side body panels, underbody shields, bumper panels, cladding (e.g., near the rear door license plate), cowls, spray nozzle body, capturing hose assembly, pillar cover, rocker panel, etc. Likewise, suitable interior automotive parts that may be formed from the fiber-reinforced composition of the present invention may include, for instance, pedal modules, instrument panels (e.g., dashboards), arm rests, consoles (e.g., center consoles), seat structures (e.g., backrest of the rear bench or seat covers), interior modules (e.g., trim, body panel, or door module), lift gates, interior organizers, step assists, ash trays, glove boxes, gear shift levers, etc. Other suitable parts may include siding panels, fence picket parts, end caps, joints, hinges, trim boards for interior and exterior decoration, synthetic roofing shingles, slates, shakes or panels, etc.

The present invention may be better understood with reference to the following examples.

Test Methods

Melt Flow Index:

The melt flow index of a polymer or polymer composition may be determined in accordance with ISO 1133-1:2011 (technically equivalent to ASTM D1238-13) at a load of 2.16 kg and temperature of 230° C.

Tensile Modulus, Tensile Stress, and Tensile Elongation at Break:

Tensile properties may be tested according to ISO Test No. 527-1:2012 (technically equivalent to ASTM D638-14). Modulus and strength measurements may be made on the same test strip sample having a length of 80 mm, thickness of 10 mm, and width of 4 mm. The testing temperature may be 23° C. or 150° C., and the testing speeds may be 1 or 5 mm/min.

Flexural Modulus, Flexural Elongation at Break, and Flexural Stress:

Flexural properties may be tested according to ISO Test No. 178:2010 (technically equivalent to ASTM D790-15e2). This test may be performed on a 64 mm support span. Tests may be run on the center portions of uncut ISO 3167 multi-purpose bars. The testing temperature may be 23° C. or 150° C. and the testing speed may be 2 mm/min.

Unotched and Notched Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C. or −30° C.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Example 1

A sample is formed that contains approximately 47.8 wt. % of a propylene homopolymer (melt flow index of 65 g/10 m in, density of 0.902 g/cm³), 1 wt. % of a coupling agent, 0.8 wt. % of a black pigment, 0.4 wt. % stabilizers, and 50 wt. % continuous glass fiber rovings (2400 Tex, filament diameter of 16 μm). The stabilizers contained 44 wt. % Irganox® 1010, 10.1 wt. % Irgafos® 168, 2 wt. % Chimassorb® 234, and 44 wt. % Ultranox® 626. The sample is melt processed in a single screw extruder (90 mm) in which the melt temperature is 265° C., the die temperature is 330° C., and the zone temperatures range from 160° C. to 320° C., and the screw speed is 160 rpm.

Example 2

A sample is formed as described in Example 1, except that it contained 0.35 wt. % of a blend of 14.3 wt. % Irganox® 3114, 28.6 wt. % Ultranox® 626, and 57.1 wt. % Irganox® PS 802.

Example 3

A sample is formed as described in Example 1, except that it contained 0.53 wt. % of a blend of 14.3 wt. % Irganox® 3114, 28.6 wt. % Ultranox® 626, and 57.1 wt. % Irganox® PS 802.

Example 4

A sample is formed as described in Example 1, except that it contained 0.70 wt. % of a blend of 14.3 wt. % Irganox® 3114, 28.6 wt. % Ultranox® 626, and 57.1 wt. % Irganox® PS 802.

The samples of Examples 1-4 were tested for tensile strength before and after aging at 150° C. The results are set forth below.

|  |  | Example 1 | Example 2 | Example 3 | Example 4 |
| --- | --- | --- | --- | --- | --- |
| Tensile Strength | MPa | 141.8 | 148.6 | 147.4 | 151.6 |
| Hours to Craze | Hour | 672 | 1,305 | 1,668 | 2,460 |
|  | 500 hours at 150° C. |  |  |  |  |
| Tensile Strength Retention | % | 72.5 | 85.7 | 80.7 | 81.8 |
|  | 1,000 hours at 150° C. |  |  |  |  |
| Tensile Strength Retention | % | 0 | 70 | 70.6 | 77.5 |

Example 5

A sample is formed that contains approximately 47.6 wt. % of a propylene homopolymer (melt flow index of 65 g/10 m in, density of 0.902 g/cm³), 1 wt. % of a coupling agent, 0.8 wt. % of a black pigment, 0.6 wt. % stabilizers, and 50 wt. % continuous glass fiber rovings (2400 Tex, filament diameter of 16 μm). The stabilizers contained 19.5 wt. % Irganox® 1010, 11 wt. % Irgafos® 168, 0.5 wt. % Chimassorb® 234, 57.9 wt. % Chimassorb® 944, and 11 wt. % Ultranox® 626. The sample is melt processed in a single screw extruder (90 mm) in which the melt temperature is 265° C., the die temperature is 330° C., and the zone temperatures range from 160° C. to 320° C., and the screw speed is 160 rpm.

Example 6

A sample is formed that contains approximately 47.8 wt. % of a propylene homopolymer (melt flow index of 65 g/10 m in, density of 0.902 g/cm³), 1 wt. % of a coupling agent, 0.8 wt. % of a black pigment, 0.4 wt. % stabilizers, and 50 wt. % continuous glass fiber rovings (2400 Tex, filament diameter of 16 μm). The stabilizers contained 9 wt. % Irganox® 3114, 26 wt. % Ultranox® 626, and 65 wt. % Irganox® PS 802. The sample is melt processed in a single screw extruder (90 mm) in which the melt temperature is 265° C., the die temperature is 330° C., and the zone temperatures range from 160° C. to 320° C., and the screw speed is 160 rpm.

Example 7

A sample is formed as described in Example 1, except that it contained 0.58 wt. % of a blend of 5.9 wt. % Irganox® 3114, 17 wt. % Ultranox® 626, 34.5 wt. % Chimmassorb® 81, and 42.6 wt. % Irganox® PS 802.

The samples of Examples 5-7 were tested for tensile strength before and after aging at 150° C. The results are set forth below.

| | | Control UV Stabilized | Control LTHA Stabilized | Sample LTHA-UV Stabilized |
|---|---|---|---|---|
| Tensile Strength | MPa | 140.2 | 147 | 140.6 |
| Hours to Craze at 150° C. | Hour | 1386 | 3432 | 1824 |
| 1,000 hours at 150° C. | | | | |
| Tensile Strength Retention | % | 54.2 | 74.3 | 71.7 |
| Xenon Arc, J2527, 2500 kj | ΔE | 0.37 | 5.94 | 2.83 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fiber-reinforced polymer composition comprising:
   a polymer matrix that contains a propylene polymer, wherein the polymer matrix constitutes from about 20 wt. % to about 90 wt. % of the composition;
   a plurality of long reinforcing fibers that are distributed within the polymer matrix, wherein the fibers constitute from about 10 wt. % to 50 wt. % of the composition; and
   a stabilizer system consisting of a sterically hindered phenol antioxidant, phosphite antioxidant, thioester antioxidant, and optionally a UV stabilizer, wherein the weight ratio of the thioester antioxidant to the phosphite antioxidant is from about 1:1 to about 5:1 and the weight ratio of the phosphite antioxidant to the sterically hindered phenol antioxidant is from about 1.5:1 to about 5:1,
   wherein the polymer composition exhibits a tensile strength from 140.6 MPa to about 300 MPa as determined according to ISO Test No. 527-1:2012 at 23° C., wherein the phosphite antioxidant is an aryl diphosphite having the following general structure (IX):

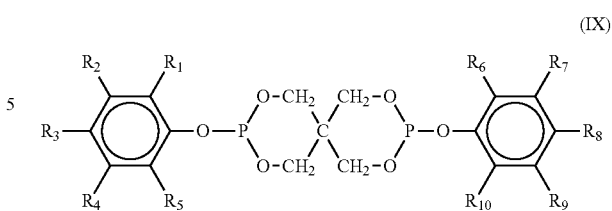

wherein,
$R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl.

2. The fiber-reinforced polymer composition of claim 1, wherein the weight ratio of the phosphite antioxidant to the sterically hindered phenol antioxidant is from about 1.5:1 to about 3:1.

3. The fiber-reinforced polymer composition of claim 1, wherein the weight ratio of the thioester antioxidant to the sterically hindered phenol antioxidant is from about 2:1 to about 10:1.

4. The fiber-reinforced polymer composition of claim 1, wherein the sterically hindered phenol antioxidant is present within the composition in an amount of from about 0.01 to about 1 wt. %.

5. The fiber-reinforced polymer composition of claim 1, wherein the sterically hindered phenol antioxidant has one of the following general structures (IV), (V) and (VI):

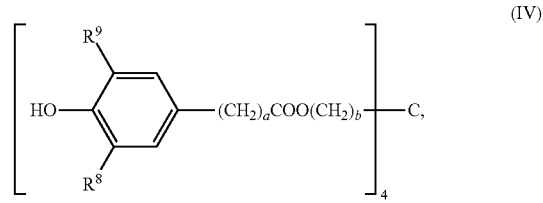

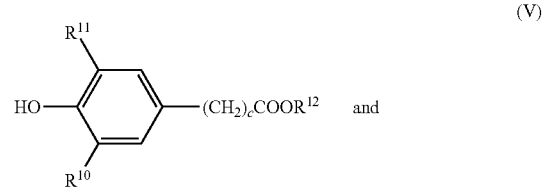

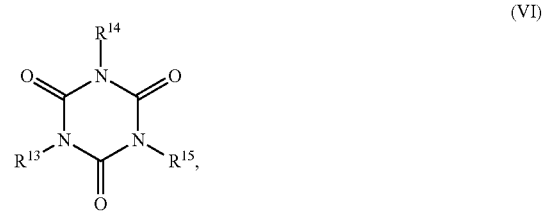

wherein,
a, b and c independently range from 1 to 10;
$R^8$, $R^9$, $R^{10}$, $R^{11}$, and $R^{12}$ are independently selected from hydrogen, $C_1$ to $C_{10}$ alkyl, and $C_3$ to $C_{30}$ branched alkyl; and
$R^{13}$, $R^{14}$ and $R^{15}$ are independently selected from moieties represented by one of the following general structures (VII) and (VIII):

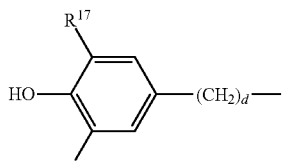
(VII)

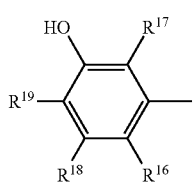
(VIII)

wherein,
d ranges from 1 to 10; and
$R^{16}$, $R^{17}$, $R^{18}$, and $R^{19}$ are independently selected from hydrogen, $C_1$ to $C_{10}$ alkyl, and $C_3$ to $C_{30}$ branched alkyl.

6. The fiber-reinforced polymer composition of claim 5, wherein the sterically hindered phenol antioxidant has the general structure (VI).

7. The fiber-reinforced polymer composition of claim 6, wherein the sterically hindered phenol antioxidant includes tris(3,5-di-tert-butyl-4-hydroxybenzyl)-isocyanurate.

8. The fiber-reinforced polymer composition of claim 1, wherein the phosphite antioxidant is present within the composition in an amount of from about 0.02 to about 2 wt. %.

9. The fiber-reinforced polymer composition of claim 1, wherein the aryl diphosphite includes bis(2,4-dicumylphenyl)pentaerythritol diphosphite, bis(2,4-di-t-butylphenyl) pentaerythritol diphosphite, or a combination thereof.

10. The fiber-reinforced polymer composition of claim 1, wherein the thioester antioxidant is present within the composition in an amount of from about 0.04 to about 4 wt. %.

11. The fiber-reinforced polymer composition of claim 1, wherein the thioester antioxidant is a thiocarboxylic acid ester having the following general structure:

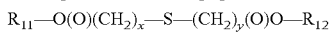

wherein,
x and y are independently from 1 to 10; and
$R_{11}$ and $R_{12}$ are independently selected from linear or branched, $C_6$ to $C_{30}$ alkyl.

12. The fiber-reinforced polymer composition of claim 11, wherein the thiocarboxylic acid ester is distearyl thiodipropionate, dilauryl thiodipropionate, di-2-ethylhexyl-thiodipropionate, diisodecyl thiodipropionate, or a combination thereof.

13. The fiber-reinforced polymer composition of claim 1, wherein the polymer matrix contains a propylene homopolymer, propylene/α-olefin copolymer, or a combination thereof.

14. The fiber-reinforced polymer composition of claim 1, wherein the fiber-reinforced composition comprises from about 0.1 wt. % to about 15 wt. % of a compatibilizer.

15. The fiber-reinforced polymer composition of claim 14, wherein the compatibilizer includes a polyolefin that is modified with a polar functional group.

16. The fiber-reinforced composition of claim 1, wherein the fibers are glass fibers.

17. The fiber-reinforced polymer composition of claim 1, wherein the fibers are oriented in a longitudinal direction of the composition.

18. A shaped part that comprises the fiber-reinforced composition of claim 1.

19. The shaped part of claim 18, wherein the part is injection molded.

20. The shaped part of claim 18, wherein the part has a wall thickness of about 2.5 millimeters or less.

21. An automotive part comprising the fiber-reinforced composition claim 1.

22. A fiber-reinforced polymer composition comprising:
a polymer matrix that contains a propylene polymer, wherein the polymer matrix constitutes from about 20 wt. % to about 90 wt. % of the composition;
a plurality of long reinforcing fibers that are distributed within the polymer matrix, wherein the fibers constitute from about 10 wt. % to about 60 wt. % of the composition; and
a stabilizer system consisting of a sterically hindered phenol antioxidant, a phosphite antioxidant, a thioester antioxidant, and optionally a UV stabilizer, wherein the weight ratio of the phosphite antioxidant to the sterically hindered phenol antioxidant is from about 1.5:1 to about 5:1, and wherein the phosphite antioxidant is an aryl diphosphite having the following general structure (IX):

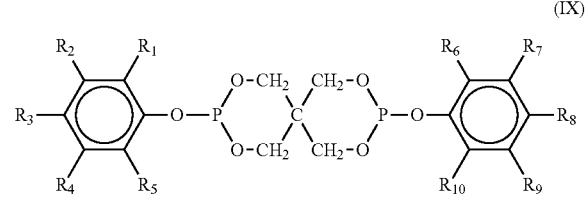
(IX)

wherein,
$R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl.

23. The fiber-reinforced polymer composition of claim 1, wherein the stabilizer system is present within the composition in an amount of from about 0.35 to about 0.7 wt. %.

24. A fiber-reinforced polymer composition comprising:
a polymer matrix that contains a propylene polymer, wherein the polymer matrix constitutes from about 20 wt. % to about 90 wt. % of the composition;
a plurality of long reinforcing fibers that are distributed within the polymer matrix, wherein the fibers constitute from about 10 wt. % to about 60 wt. % of the composition; and
a stabilizer system consisting of a sterically hindered phenol antioxidant, a phosphite antioxidant, a thioester antioxidant, and optionally a UV stabilizer, wherein the weight ratio of the phosphite antioxidant to the sterically hindered phenol antioxidant is from about 1.5:1 to about 5:1.

* * * * *